(12) United States Patent
Baek

(10) Patent No.: US 9,941,494 B2
(45) Date of Patent: Apr. 10, 2018

(54) BATTERY PACK

(71) Applicant: SAMSUNG SDI CO., LTD., Yongin-si, Gyeonggi-do (KR)

(72) Inventor: Mooryong Baek, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 640 days.

(21) Appl. No.: 14/244,867

(22) Filed: Apr. 3, 2014

(65) Prior Publication Data
US 2015/0155545 A1  Jun. 4, 2015

(30) Foreign Application Priority Data

Dec. 3, 2013 (KR) .................. 10-2013-0149381

(51) Int. Cl.
  *H01M 10/42* (2006.01)
  *H01M 2/10* (2006.01)
  *H01M 2/20* (2006.01)

(52) U.S. Cl.
  CPC .......... *H01M 2/105* (2013.01); *H01M 2/204* (2013.01); *H01M 10/4257* (2013.01); *H01M 2200/106* (2013.01)

(58) Field of Classification Search
  CPC ......... H01M 10/425; H01M 2/02; H01M 2/04
  See application file for complete search history.

(56) References Cited

U.S. PATENT DOCUMENTS

| 5,962,159 | A | * | 10/1999 | Satou | .................. | H01M 2/1055 |
|---|---|---|---|---|---|---|
| | | | | | | 429/1 |
| 2005/0271934 | A1 | * | 12/2005 | Kiger | .................... | H01M 2/105 |
| | | | | | | 429/159 |
| 2011/0151285 | A1 | * | 6/2011 | Hong | .................... | H01M 2/105 |
| | | | | | | 429/7 |
| 2013/0045397 | A1 | | 2/2013 | Pyo | | |

FOREIGN PATENT DOCUMENTS

| KR | 10-2009-0037769 A | 4/2009 |
|---|---|---|
| KR | 10-2011-0070030 A | 6/2011 |
| KR | 10-2012-0012078 A | 2/2012 |
| KR | 10-2013-0019187 A | 2/2013 |

* cited by examiner

*Primary Examiner* — Maria Laios
(74) *Attorney, Agent, or Firm* — Lewis Roca Rothgerber Christie LLP

(57) ABSTRACT

A battery pack including a battery cell, a plurality of electrode tabs coupled to and extending from terminals of the battery cell, a protect circuit module (PCM) to control charging and discharging of the battery cell, a flexible printed circuit board (FPCB) including a plurality of connection pads coupled to the electrode tabs and electrically coupling the battery cell to the PCM, and a case accommodating the battery cell, the electrode tabs, the PCM, and the FPCB, wherein the case includes a first case accommodating the battery cell and a second case covering the first case, and wherein the first case includes ribs extending toward the second case and has cut-out grooves at regions corresponding to the connection pads.

15 Claims, 7 Drawing Sheets

BATTERY PACK

CROSS-REFERENCE TO RELATED APPLICATION

This application claims priority to and the benefit of Korean Patent Application No. 10-2013-0149381, filed on Dec. 3, 2013 in the Korean Intellectual Property Office, the entire contents of which are incorporated herein by reference.

BACKGROUND

1. Field

Aspects of embodiments of the present invention are directed toward a battery pack.

2. Description of the Related Art

With recent, rapid developments in electronic, communications, and computer industries, portable electronic devices have recently come into widespread use. Secondary batteries (i.e., rechargeable batteries) are widely used as power sources of the portable electronic devices.

Secondary batteries, each including a single battery cell, can be used in small-sized electronic devices, such as cellular phones. However, in medium- and large-sized apparatuses or devices, such as notebook computers, machine tools, and electric bicycles, which require high output and high power, a battery pack is used by coupling (e.g., connecting) a plurality of battery cells in series or in parallel.

SUMMARY

Aspects of embodiments of the present invention are directed toward a battery pack, which has one or more cut-out grooves formed on an inner surface of a case at a region corresponding to a solder layer that couples (e.g., connects) an electrode tab and a flexible printed circuit board (FPCB), thereby preventing or reducing interference between the solder layer and the inside of the case.

According to one embodiment of the present invention, a battery pack includes a battery cell, a plurality of electrode tabs coupled to and extending from terminals of the battery cell, a protect circuit module (PCM) to control charging and discharging of the battery cell, a flexible printed circuit board (FPCB) including a plurality of connection pads coupled to the electrode tabs and electrically coupling the battery cell to the PCM, and a case accommodating the battery cell, the electrode tabs, the PCM, and the FPCB, wherein the case includes a first case accommodating the battery cell and a second case covering the first case, and wherein the first case includes ribs extending toward the second case and has cut-out grooves at regions corresponding to the connection pads.

One end of each of the electrode tabs may be electrically coupled to the battery cell and another end of each of the electrode tabs may be electrically coupled to respective ones of the connection pads.

The electrode tabs and the connection pads may be coupled to each other by solder.

The cut-out grooves may be at regions corresponding to the solder.

The FPCB may surround a portion of the battery cell.

The FPCB may further include a plurality of wiring patterns.

The FPCB may further include an insulation layer surrounding and electrically insulating the wiring patterns.

The connection pads may be exposed by the insulation layer.

One end of each of the wiring patterns may be electrically coupled to respective ones of the connection pads and another end of each of the wiring patterns may be electrically coupled to the PCM.

The FPCB may further include a plurality of openings allowing the electrode tabs to pass therethrough at locations corresponding to the electrode tabs.

A side portion of the second case may be coupled between a side portion of the first case and each of the ribs.

The side portion of the first case, the ribs, and the side portion of the second case may be coupled at regions outside of regions corresponding to the connection pads.

The first case may include a relatively wide bottom portion, and the second case may include a cover part facing the bottom portion, and the cover part may have a recessed groove at a region of an inner surface of the cover part corresponding to the FPCB.

The region of the cover part corresponding to the FPCB may have a thickness less than a thickness of a region outside the region corresponding to the FPCB.

As described above, the battery pack according to an embodiment of the present invention has one or more cut-out grooves formed on an inner surface of a case at a region corresponding to a solder layer that couples (e.g., connects) an electrode tab and a flexible printed circuit board (FPCB), thereby preventing or reducing interference between the solder layer and the inside of the case.

In addition, it is possible to prevent or reduce interference between the FPCB and the inside of the case by forming a recessed groove on the inner surface of a cover part of the case having a height (i.e., a depth) corresponding to a thickness of the FPCB that surrounds the battery cell.

Additional aspects and/or features of the invention will be set forth in part in the description which follows and, in part, will be obvious from the description or may be learned by practice of the invention.

BRIEF DESCRIPTION OF THE DRAWINGS

The objects, features, and characteristics of the present invention will be more apparent from the following detailed description in conjunction with the accompanying drawings, in which.

DETAILED DESCRIPTION

Figure 1:
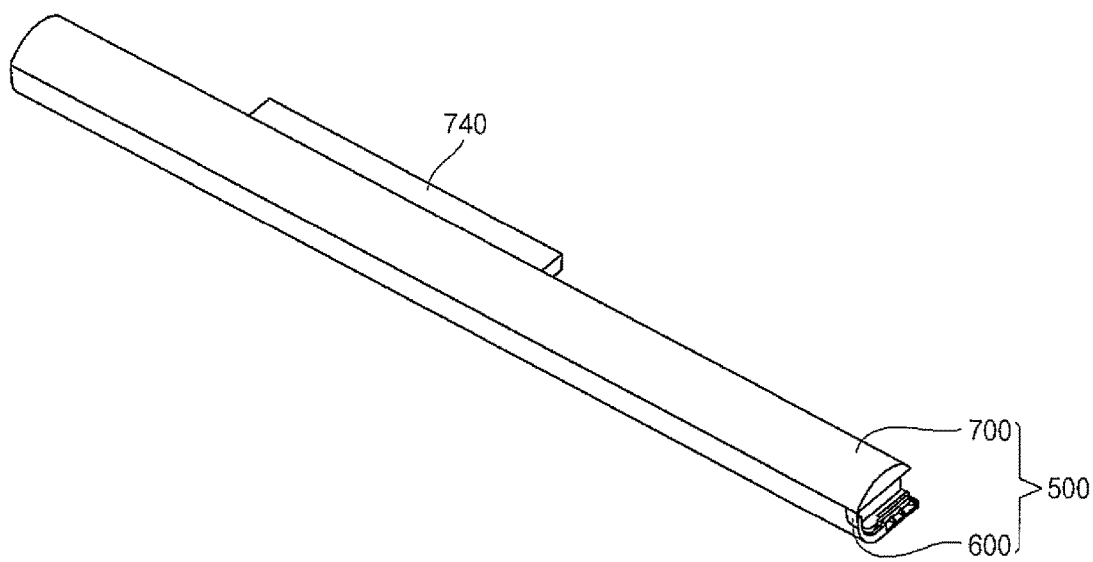
FIG. 1 is a perspective view illustrating an assembled state of a battery pack according to an embodiment of the present invention.

Hereinafter, some example embodiments are described in further detail with reference to the accompanying drawings.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey embodiments of the invention to those skilled in the art.

In the drawings, thicknesses of layers and regions may be exaggerated for clarity. Like numbers refer to like elements throughout. As used herein, the term "and/or" includes any and all combinations of one or more of the associated listed items. Further, the use of "may" relates to "one or more embodiments of the present invention".

The terminology used herein is for the purpose of describing particular embodiments and is not intended to be limiting of the invention. As used herein, singular forms are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers, and/or parts, these members, elements, regions, layers, and/or parts should not be limited by these terms. These terms are merely used to distinguish one member, element, region, layer, and/or part from another member, element, region, layer, and/or part. Thus, for example, a first member, element, region, layer, and/or part discussed below could be termed a second member, element, region, layer, and/or part without departing from the teachings of the present invention.

A battery pack according to an example embodiment of the present invention will now be described with reference to the accompanying drawings.

Figure 2:
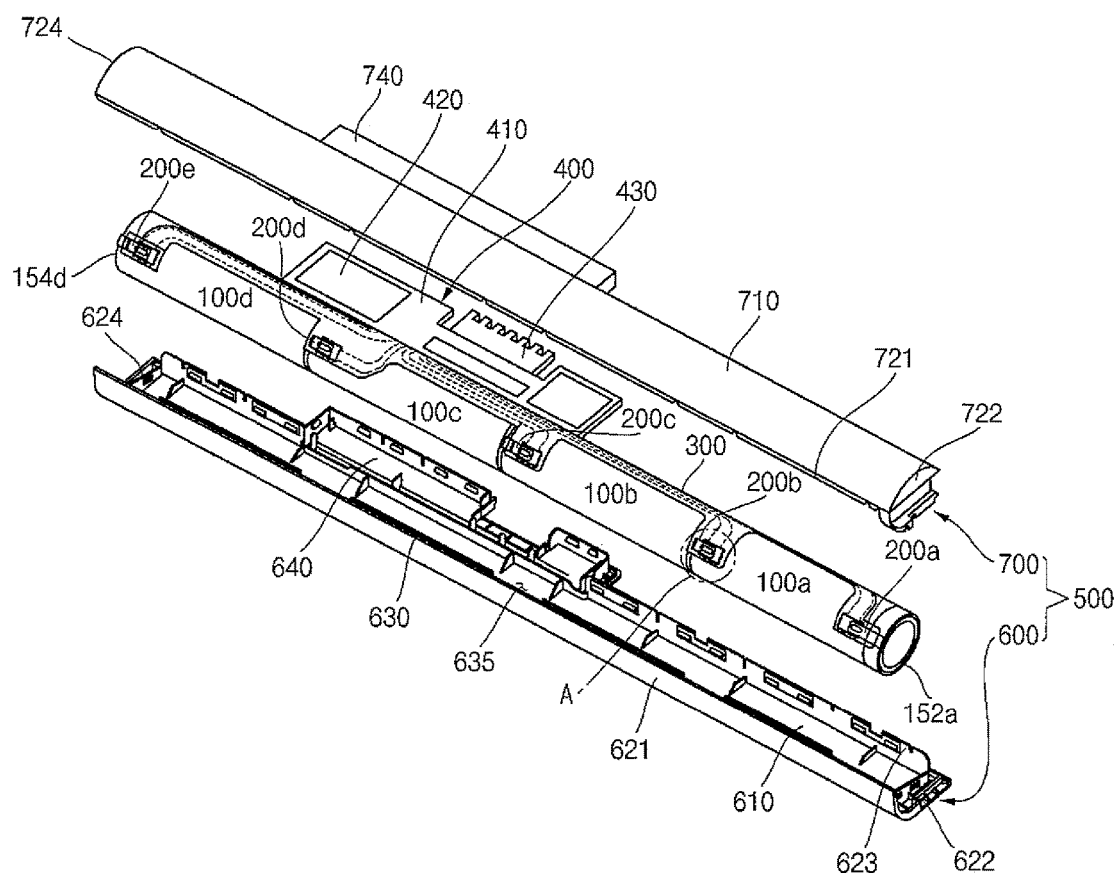
FIG. 2 is an exploded perspective view of the battery pack according to an embodiment of the present invention.
Figure 3:
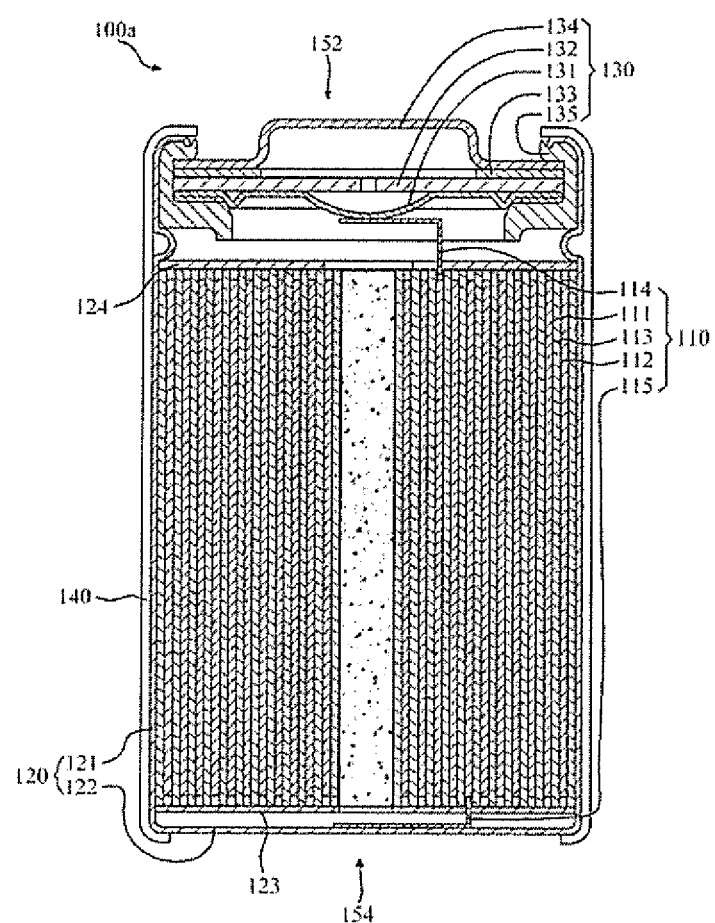
FIG. 3 is a sectional view of a battery cell of a battery pack according to an embodiment of the present invention.
Figure 4:
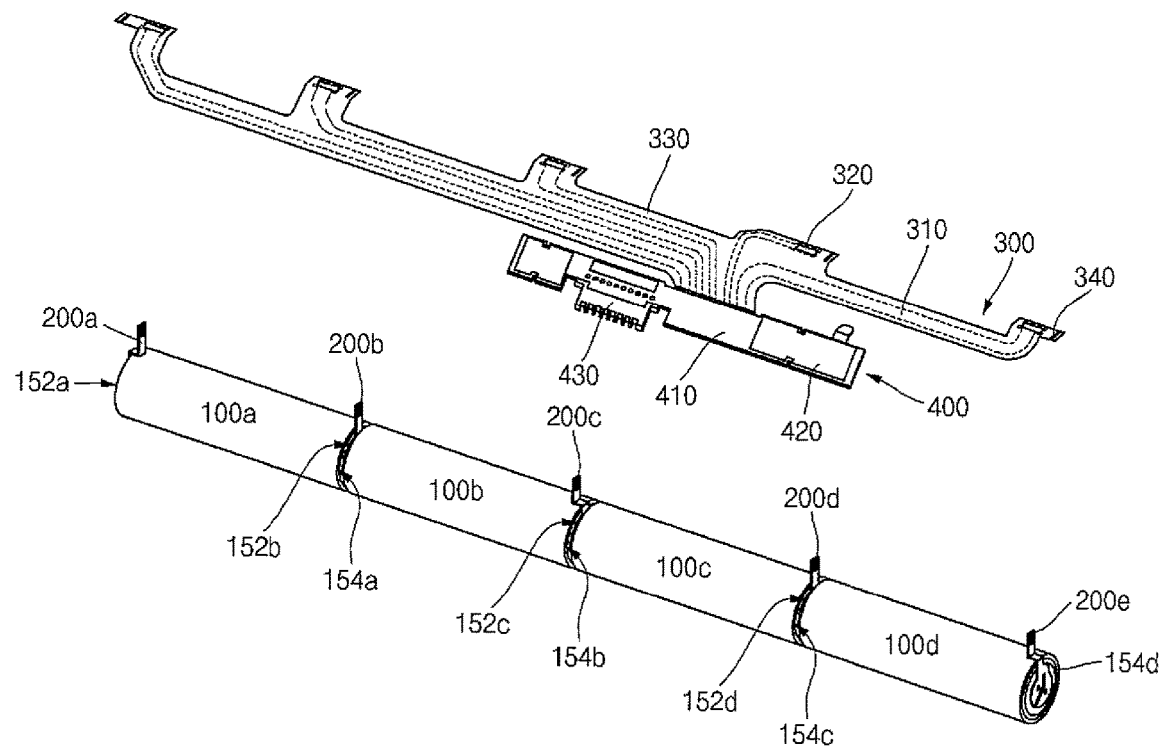
FIG. 4 is an exploded perspective view of a plurality of battery cells and a circuit board in a battery pack according to an embodiment of the present invention.
Figure 5:
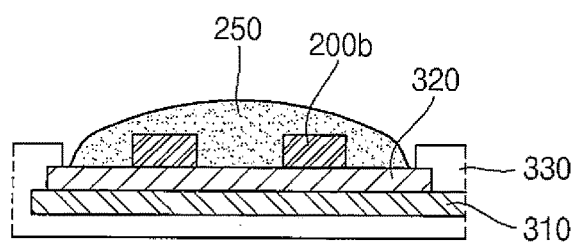
FIG. 5 is an enlarged sectional view of portion 'A' of FIG. 2.
Figure 6:
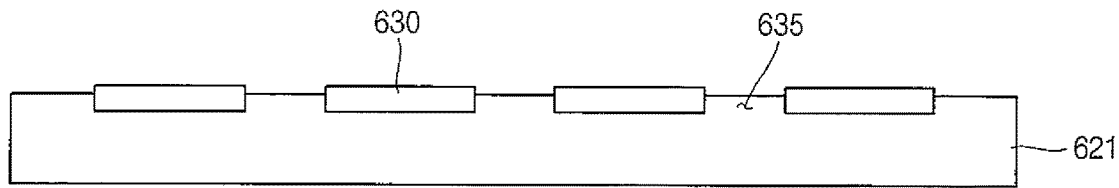
FIG. 6 is a front view illustrating the inner surface of a first side portion of a first case of a battery pack according to an embodiment of the present invention.
Figure 7:
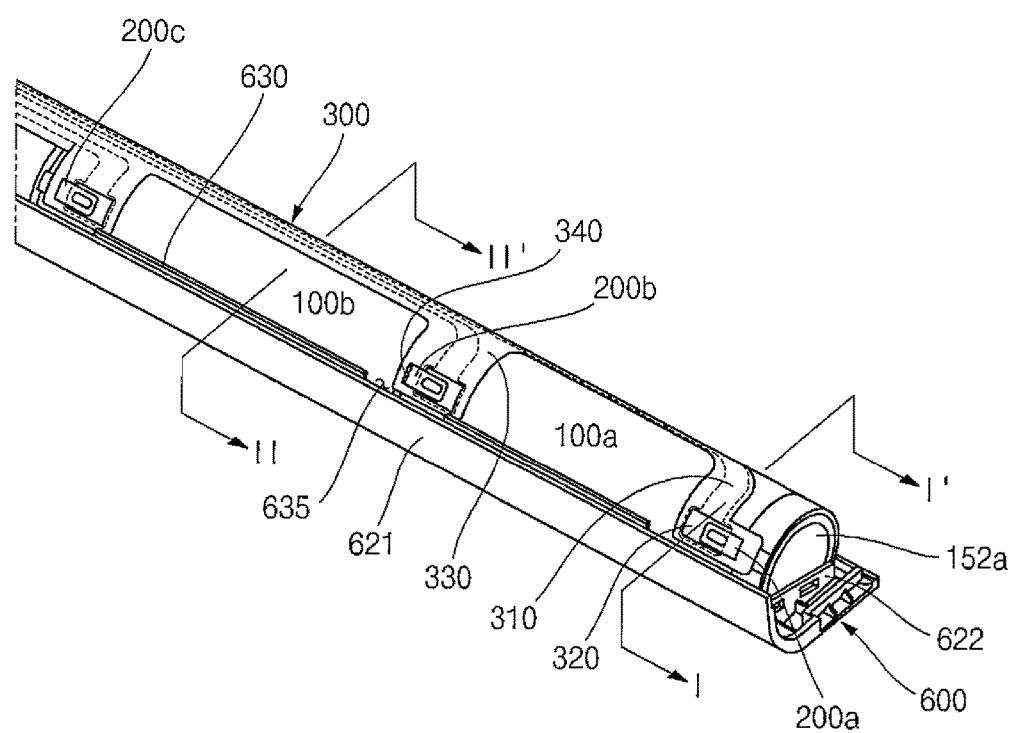
FIG. 7 is a partial perspective view illustrating a battery pack in an assembled state in which a battery cell and a first case are assembled with each other according to an embodiment of the present invention.
Figure 8A:
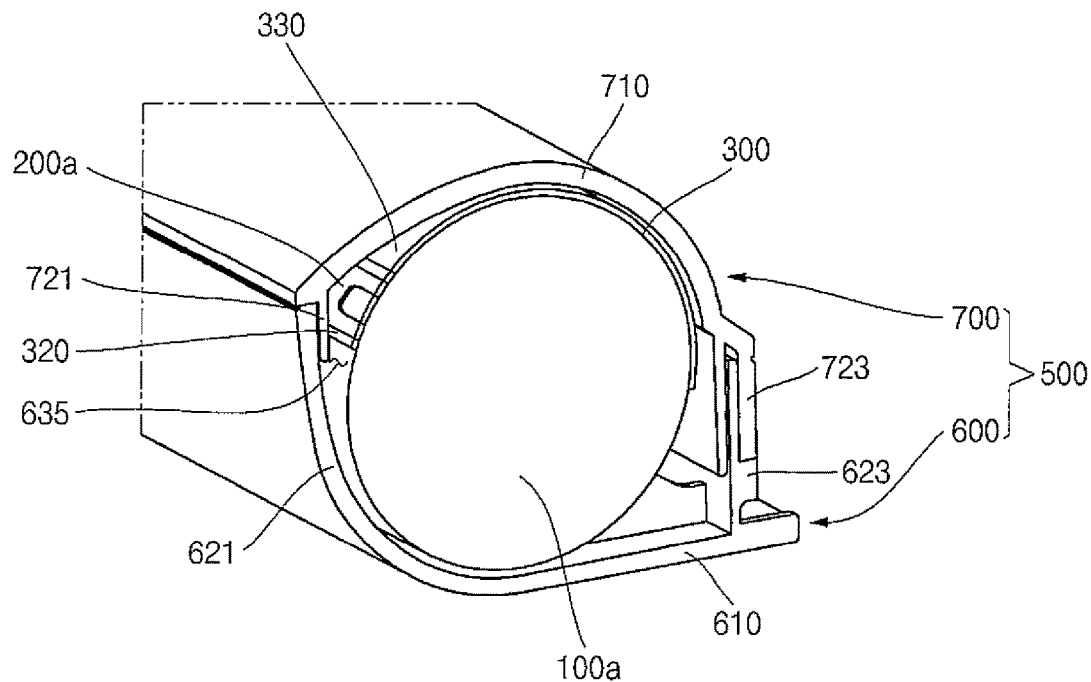
FIGS. 8A and 8B are partially perspective views taken along lines I-I' and II-II' of FIG. 7 of a battery pack according to an embodiment of the present invention.
Figure 8B:
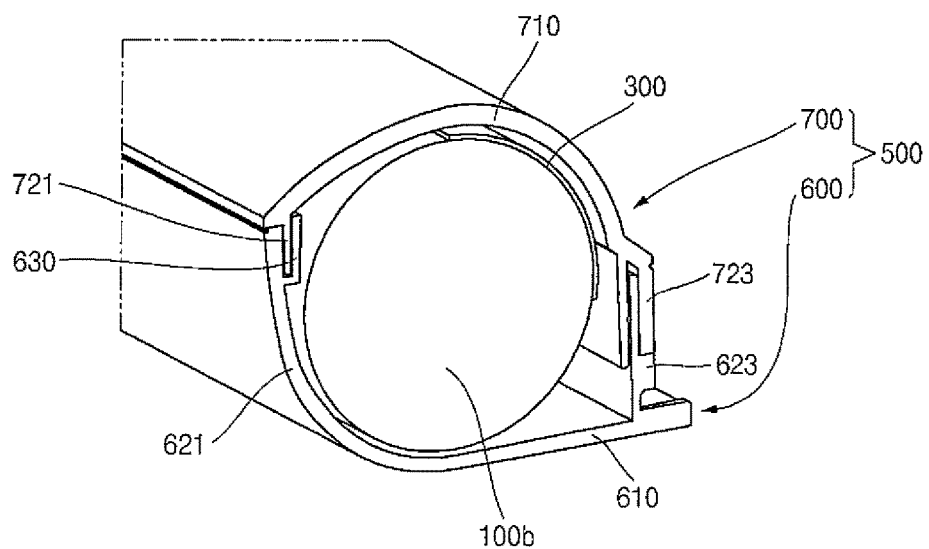

FIG. 1 is a perspective view illustrating an assembled state of a battery pack according to an embodiment of the present invention, FIG. 2 is an exploded perspective view of the battery pack according to an embodiment of the present invention, FIG. 3 is a sectional view of a battery cell of a battery pack according to an embodiment of the present invention, FIG. 4 is an exploded perspective view of a plurality of battery cells and a circuit board in a battery pack according to an embodiment of the present invention, FIG. 5 is an enlarged sectional view of portion 'A' of FIG. 2, FIG. 6 is a front view illustrating the inner surface of a first side portion of a first case of a battery pack according to an embodiment of the present invention, FIG. 7 is a partial perspective view illustrating a battery pack in an assembled state in which a battery cell and a first case are assembled with each other according to an embodiment of the present invention, and FIGS. 8A and 8B are partial perspective views taken along the lines I-I' and II-II' of FIG. 7 of a battery pack according to an embodiment of the present invention.

Referring to FIGS. 1 to 8B, a battery pack 10 according to an embodiment of the present invention includes a plurality of battery cells 100, a plurality of electrode tabs 200a, 200b, 200c, 200d, and 200e, a flexible printed circuit board (FPCB) 300, a protect circuit module (PCM) 400, and a case 500.

The plurality of battery cells 100 include battery cells 100a, 100b, 100c, and 100d coupled (e.g., connected) in series or in parallel to each other. In the illustrated embodiment, four battery cells 100a, 100b, 100c, and 100d are provided, but the present invention does not limit the number of battery cells to four. In addition, in the illustrated embodiment, four battery cells 100a, 100b, 100c, and 100d are arranged along a line, but the battery cells 100 may be arranged along, for example, multiple lines. For the sake of convenient explanation, when it is intended to refer to one of the battery cells 100a, 100b, 100c, and 100d, the battery cell denoted by reference numeral 100a is referred to a first battery cell, the battery cell denoted by reference numeral 100b is referred to a second battery cell, the battery cell denoted by reference numeral 100c is referred to a third battery cell, and the battery cell denoted by reference numeral 100d is referred to a fourth battery cell.

The first battery cell 100a includes an electrode assembly 110, a can 120, a cap assembly 130, and a label 140. This configuration also applies to the other battery cells 100b, 100c, and 100d.

The electrode assembly 110 includes a first electrode plate 111, a second electrode plate 112, and a separator 113 between the first and second electrode plates 111 and 112. In addition, the first and second electrode plates 111 and 112 and the separator 113 are wound together.

The electrode assembly 110 includes a first electrode lead 114 electrically coupled to (e.g., electrically connected to) the first electrode plate 111 and a second electrode lead 115 electrically coupled to (e.g., electrically connected to) the second electrode plate 112. In one embodiment, the first electrode lead 114 is electrically coupled to (e.g., electrically connected to) the cap assembly 130, and the second electrode lead 115 is electrically coupled to (e.g., electrically connected to) the can 120. The first electrode plate 111 may be a positive electrode plate, and the second electrode plate 112 may be a negative electrode plate. However, the first electrode plate 111 may be a negative electrode plate, and the second electrode plate 112 may be a positive electrode plate. In the illustrated embodiment, for the sake of convenient explanation, it is assumed that the first electrode plate 111 is the positive electrode plate and the second electrode plate 112 is the negative electrode plate. Therefore, the cap assembly 130 electrically coupled to (e.g., electrically connected to) the first electrode plate 111 may become a positive electrode terminal 152, and the can 120, for example, a bottom surface 122 of the can 120, may become a negative electrode terminal 154.

The can 120 is formed of a substantially cylindrical metal case having a top opening. The can 120 has a cylindrical surface 121 (e.g., a side surface) having a diameter and the bottom surface 122 defining a space for accommodating the electrode assembly 110.

A lower insulation plate 123 and an upper insulation plate 124 are provided with the electrode assembly 110 in the receiving space of the can 120. The lower insulation plate 123 and the upper insulation plate 124 prevent the first and second electrode plates 111 and 112 of the electrode assembly 110 from making contact with the can 120 and being short circuited when the electrode assembly 110 is received in the can 120.

The cap assembly 130 seals the opening of the can 120. The cap assembly 130 includes a safety vent 131 that becomes inverted when the internal pressure of the battery cell 100a exceeds a reference pressure (e.g., a predetermined pressure). A current interruption unit 132 is electrically and mechanically coupled to (e.g., connected to) a top portion of the safety vent 131 (e.g., a substantially flat portion at a periphery of the safety vent 131) and becomes disconnected (e.g., enters a disconnected state) when the safety vent 131 inverts (e.g., is deformed to become inverted). In addition, a positive temperature coefficient unit (PTC) 133 is electrically and mechanically coupled to (e.g., connected to) a top portion of the current interruption unit 132 and resistance thereof sharply increases when the internal temperature of the battery cell 100a rises (increases). In addition, a cap-up 134 is electrically and mechanically coupled to (e.g., connected to) a top portion of the PTC 133. In addition, the cap assembly 130 further includes a gasket 135 insulating the safety vent 131, the current interruption unit 132, the PTC 133, and the cap-up 134 from the can 120 and sealing the receiving space of the can 120 while surrounding lateral peripheries of the safety vent 131, the current interruption unit 132, the PTC 133, and the cap-up 134.

The label 140 covers at least the cylindrical surface 121 of the can 120 and protects the cylindrical surface 121 of the battery cell 100a. In addition, the label 140 allows the cap-up 134 to become the positive electrode terminal 152 and to be exposed to the outside of the battery cell 100a and allows the bottom surface 122 of the can 120 to become the negative electrode terminal 154 and to be exposed to the outside of the battery cell 100a. In other words, the label 140 is between the cap-up 134, that is, the positive electrode terminal 152, and the bottom surface 122 of the can 120, that is, the negative electrode terminal 154. The label 140 may be made of a thermally shrinkable film.

The plurality of battery cells 100 are arranged such that the negative electrode terminal 154a of the first battery cell 100a and the positive electrode terminal 152b of the second battery cell 100b are brought into contact with each other, the negative electrode terminal 154b of the second battery cell 100b and the positive electrode terminal 152c of the third battery cell 100c are brought into contact with each other, and the negative electrode terminal 154c of the third battery cell 100c and the positive electrode terminal 152d of the fourth battery cell 100d are brought into contact with each other.

The electrode tabs 200a, 200b, 200c, 200d, and 200e couple (e.g., connect) the plurality of battery cells 100 in series or in parallel to each other. In the illustrated embodiment, the electrode tabs 200a, 200b, 200c, 200d, and 200e are illustrated as coupling (e.g., connecting) the plurality of battery cells 100 in series to each other. The electrode tabs 200a, 200b, 200c, 200d, and 200e include a first electrode tab 200a, a second electrode tab 200b, a third electrode tab 200c, a fourth electrode tab 200d, and a fifth electrode tab 200e. The first electrode tab 200a is coupled to (e.g., connected to) the positive electrode terminal 152a of the first battery cell 100a, the second electrode tab 200b is coupled to (e.g., connected to) both of the negative electrode terminal 154a of the first battery cell 100a and the positive electrode terminal 152b of the second battery cell 100b, the third electrode tab 200c is coupled to (e.g., connected to) both of the negative electrode terminal 154b of the second battery cell 100b and the positive electrode terminal 152c of the third battery cell 100c, the fourth electrode tab 200d is coupled to (e.g., connected to) both of the negative electrode terminal 154c of the third battery cell 100c and the positive electrode terminal 152d of the fourth battery cell 100d, and the fifth electrode tab 200e is coupled to (e.g., connected to) the negative electrode terminal 154d of the fourth battery cell 100d. In other words, the first electrode tab 200a from among the electrode tabs 200a, 200b, 200c, 200d, and 200e (to be collectively denoted by 200 hereinafter) becomes a positive electrode of the battery pack 10, and the fifth electrode tab 200e becomes a negative electrode of the battery pack 10.

One end of each of the electrode tabs 200 comes into contact with a positive electrode terminal or a negative electrode terminal of the battery cells 100a, 100b, 100c, and 100d (to be collectively denoted by 100, hereinafter). In one embodiment, the one end of each of the electrode tabs 200 may be welded to the positive electrode terminal or the negative electrode terminal of respective ones of the battery cells 100, and the welding may be performed by, for example, resistance welding. In addition, another end of each of the electrode tabs 200 protrudes from between the positive electrode terminal or the negative electrode terminal of the battery cells 100. Then, the other end of each of the electrode tabs 200 comes into contact with (e.g., is welded to) respective ones of a plurality of connection pads 320 of the FPCB 300.

The FPCB 300 includes a plurality of wiring patterns 310, the plurality of connection pads 320, and an insulation layer 330. An adhesive layer is formed under the FPCB 300 to be attached to outer surfaces of the battery cells 100.

The wiring patterns 310 are formed inside the insulation layer 330 (e.g., the wiring patterns 310 are surrounded by the insulation layer 330). The wiring patterns 310 include a plurality of wiring patterns 310 and are electrically insulated (e.g., electrically insulated from each other) by the insulation layer 330. One end of each of the wiring patterns 310 may be electrically coupled to (e.g., electrically connected to) one of the plurality of connection pads 320, and another end of each of the wiring patterns 310 may be electrically coupled to (e.g., electrically connected to) the PCM 400.

The plurality of connection pads 320 are exposed to the outside through the insulation layer 330 (e.g., the plurality of connection pads 320 are not surrounded by or are exposed by the insulation layer 330). The connection pads 320 may be formed by forming a metal layer on the wiring patterns 310. Each of the connection pads 320 is coupled to (e.g., connected to) the other end (e.g., the bent end) of the electrode tabs 200. For example, the connection pads 320 and the electrode tabs 200 may be coupled to (e.g., connected to) each other by soldering.

Referring to FIG. 5, the wiring patterns 310 are formed on or under the insulation layer 330 (e.g., the wiring patterns 310 are substantially surrounded by the insulation layer 330), and the connection pads 320 are formed on or above the wiring patterns 310. The connection pads 320 are exposed to the outside through the insulation layer 330. In addition, the connection pads 320 and the second electrode tab 200b are coupled to (e.g., connected to) each other by a solder layer 250. In the illustrated embodiment, only the second electrode tab 200b is illustrated; however, the same configuration may be applied to the first, third, fourth, and fifth electrode tabs 200a, 200c, 200d, and 200e as well. The solder layer 250 is formed at each contact region between the electrode tabs 200 and the connection pads 320.

The connection pads 320 are electrically coupled to (e.g., electrically connected to) the electrode tabs 200, respectively, and the connection pads 320 are electrically coupled to (e.g., electrically connected to) the wiring patterns 310, respectively. Therefore, the battery cells 100 may be electrically coupled to (e.g., electrically connected to) the PCM 400 through the wiring patterns 310 and the connection pads 320. As many connection pads 320 as the electrode tabs 200 are formed (i.e., a same number of the connection pads 320 and the electrode tabs 200 are formed) such that the plurality of electrode tabs 200 are each coupled to (e.g., connected to) the PCM 400.

The insulation layer 330 is a layer forming a main body of the FPCB 300, and the plurality of wiring patterns 310 are formed within the insulation layer 330 (e.g., the plurality of wiring patterns 310 are surrounded by the insulation layer 330). The insulation layer 330 insulates the wiring patterns 310 from each other and insulates the wiring patterns 310 from the outside.

A plurality of openings 340 (e.g., through-holes) through which the electrode tabs 200 can pass are further provided in the insulation layer 330. The electrode tabs 200 may be bent (or further bent) after passing through the plurality of openings 340 to be coupled to (e.g., connected to) the connection pads 320. In one embodiment, the openings 340 are positioned to be close to the connection pads 320 to allow the electrode tabs 200 to easily contact the connection pads 320. When the electrode tabs 200 are coupled to (e.g., connected to) the connection pads 320 by the solder layer 250, the openings 340 may fix positions of the electrode tabs 200. The openings 340 may also be formed such that as many of the openings 340 as the connection pads 320 are provided (i.e., a same number of the openings 340 and the connection pads 320 are provided) to allow each of the plurality of electrode tabs 200 to be coupled (e.g., connected to) the PCM 400.

The PCM 400 controls the battery pack 10 according to the embodiment of the present invention. The PCM 400 includes a substrate 410, a plurality of control devices 420 formed on the substrate 410, such as IC (integrated circuit) devices, and a connection member 430 coupling (e.g., connecting) the battery pack 10 to an external device. In addition, the plurality of wiring patterns 310 are also coupled to (e.g., formed at) the PCM 400, thereby electrically coupling (e.g., connecting) the wiring patterns 310 of the FPCB 300 to the control devices 420 and the connection member 430. The PCM 400 is coupled to (e.g., connected to) the battery cells 100 through the wiring patterns 310, thereby controlling charging and/or discharging of the battery cells 100.

The case 500 includes a first case 600 and a second case 700. The first case 600 has a one-side region that is opened, so that the battery cells 100, the electrode tabs 200, the FPCB 300, and the PCM 400 are placed in (i.e., received in or accommodated in) the first case 600 through the opened one-side region. The second case 700 covers the opened one-side region of the first case 600.

The first case 600 has a receiving space in which the battery cells 100 are received (e.g., accommodated). In other words, the first case 600 includes a relatively wide bottom portion 610 on which the battery cells 100 are placed and first, second, third, and fourth side portions 621, 622, 623, and 624 extending from edges of the bottom portion 610 toward the second case 700. In one embodiment, the first side portion 621 and the third side portion 623 correspond to long sides of the bottom portion 610, and the second side portion 622 and the fourth side portion 624 correspond to short sides of the bottom portion 610.

The second case 700 seals the opened region of the first case 600. The second case 700 includes a cover part 710 corresponding to the bottom portion 610 of the first case 600 and first, second, third, and fourth side portions 721, 722, 723, and 724 extending from the edge of the cover part 710 toward the first case 600. In one embodiment, the first side portion 721 and the third side portion 723 correspond to long sides of the cover part 710, and the second side portion 722 and the fourth side portion 724 correspond to short sides of the cover part 710.

The cases 600 and 700 are combined with each other such that the first, second, third, and fourth side portions 621, 622, 623, and 624 of the first case 600 correspond to the first, second, third, and fourth side portions 721, 722, 723, and 724 of the second case 700.

The first side portion 621 of the first case 600 may further include ribs 630 extending from an inner surface thereof toward the second case 700. The ribs 630 may be formed to be substantially parallel to the first side portion 621 (e.g., substantially parallel to an upper portion of the first side portion 621). In addition, the first side portion 721 of the second case 700 is inserted between the first side portion 621 and the ribs 630, thereby achieving assembly of the case 500. In one embodiment, grooves or protrusions are formed on the ribs 630, and protrusion or grooves are formed on the first side portion 721 of the second case 700, thereby assembling the case 500 more firmly. In addition, in the illustrated embodiment, the ribs 630 are formed on the first side portion 621 of the first case 600. However, the ribs 630 may also be formed on the first side portion 721 of the second case 700. In addition, the ribs 630 may be formed on the second, third, and fourth side portions 722, 723, and 724 as well as on the first side portion 721.

Cut-out grooves 635 are formed at regions of the first side portion 621 corresponding to the connection pads 320. In other words, the ribs 630 are not formed at regions corresponding to the connection pads 320. For example, referring to FIG. 7, the cut-out grooves 635 are formed at contact regions between the connection pads 320 and the electrode tabs 200. Therefore, even when the solder layer 250 is formed and protrudes to couple (e.g., connect) the connection pads 320 to the electrode tabs 200, interference between the ribs 630 and the solder layer 250 does not occur.

For example, referring to FIGS. 8A and 8B, the cut-out grooves 635 are formed at regions corresponding to where the solder layer 250 is formed. And the ribs 630 are formed at regions without the solder layer 250 (e.g., at regions where the solder layer 250 is not formed), thereby the ribs 630 and the first side portion 721 of the second case 700 are coupled to each other. The solder layer 250 is formed at contact regions between the connection pads 320 and the electrode tabs 200.

As described above, in the battery pack 10 according to the embodiment of the present invention, the cut-out grooves 635 are formed at regions of the inner surface of the first case 600 corresponding to soldered regions. Therefore, even if the soldered regions (e.g., the solder layer 250) between the electrode tabs 200 and the connection pads 320 are formed to protrude to electrically couple (e.g., electrically connect) the battery cells 100 to the FPCB 300, interference between the inside of the first case 600 and the soldered regions does not occur. Therefore, it is possible to prevent the first case 600 from protruding (e.g., further protruding) due to the soldered regions. In other words, it is possible to prevent internal damage or external impairment of the battery pack 10 from occurring.

Hereinafter, a battery pack according to another embodiment of the present invention will now be described.

Figure 9:
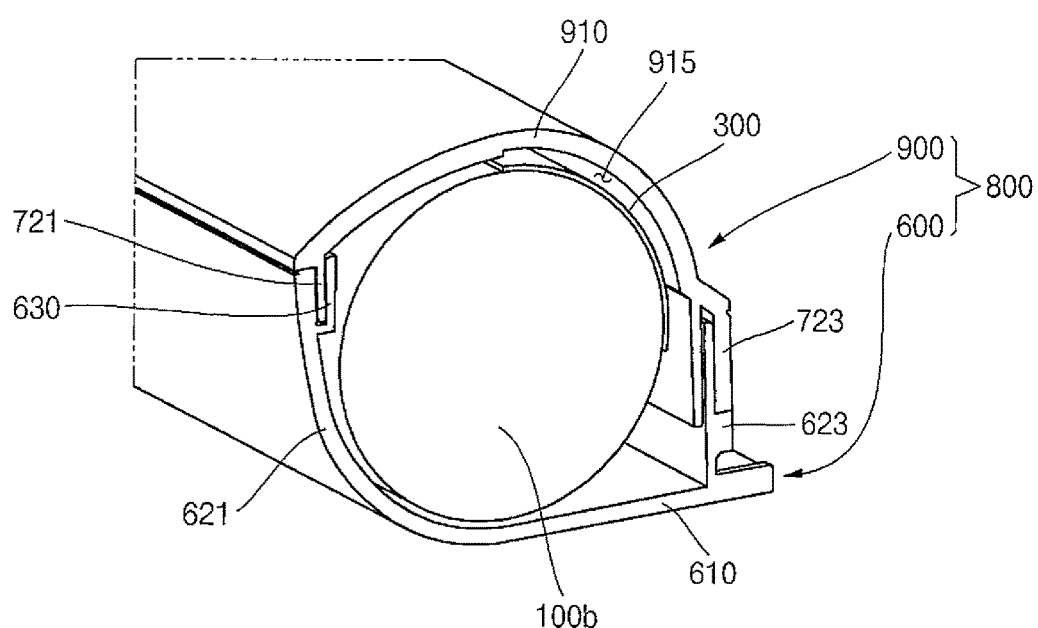
FIG. 9 is a partial perspective view illustrating a portion corresponding to FIG. 8B in a battery pack according to another embodiment of the present invention.

FIG. 9 is a partially perspective view illustrating a portion corresponding to FIG. 8B of a battery pack according to another embodiment of the present invention. The same functional elements as those of the previous embodiment are denoted by the same reference numerals, and the following description will focus on differences between the current and previous embodiments.

The battery pack according to the current embodiment is substantially the same as the battery pack according to the previous embodiment, except for a configuration of a case 800 and a second case 900.

In the second case 900, a recessed groove 915 is formed at a region of the inner surface of a cover part 910 corresponding to an FPCB 300. In other words, the recessed groove 915 is formed on the inner surface of the cover part 910 to a depth corresponding to a thickness of the FPCB 300. In the illustrated embodiment, the battery cell 100b, the FPCB 300, and the cover part 910 are spaced from each other. However, according to this embodiment, the battery cell 100b, the FPCB 300, and the cover part 910 are actually tightly combined with each other. Therefore, interference between the FPCB 300 and the inside of the case 800 due to the thickness of the FPCB 300 can be minimized or reduced. In other words, it is possible to minimize or reduce damage to the FPCB 300 due to interference (e.g., due to interference with the case 800). In addition, because it is possible to prevent the case 800 from protruding (e.g., further protruding) by the thickness of the FPCB 300, external deformation of the battery pack can be minimized or reduced.

Although the battery packs according to example embodiments of the present invention have been described in detail hereinabove, it should be understood that many variations and modifications of the basic inventive concept herein described, which may appear to those skilled in the art, will still fall within the spirit and scope of the present invention as defined by the appended claims and their equivalents.

What is claimed is:

1. A battery pack comprising:
a plurality of battery cells arranged in only a single row;
a plurality of electrode tabs coupled to and extending from respective terminals of the battery cells;
a protect circuit module (PCM) to control charging and discharging of the battery cells;
a flexible printed circuit board (FPCB) comprising a plurality of connection pads coupled to the electrode tabs and electrically coupling the battery cells to the PCM; and
a case accommodating the battery cells, the electrode tabs, the PCM, and the FPCB,
wherein the case comprises a first case accommodating the battery cells and a second case covering the first case,
wherein the first case comprises a bottom portion, a side portion extending from the bottom portion, and ribs, the ribs each having a first portion protruding from the side portion in a direction toward the battery cells and a second portion extending from the first portion in another direction toward the second case,
wherein the case has cut-out grooves at regions corresponding to the connection pads, and
wherein the electrode tabs are arranged on an opposite side of the battery cells as the PCM.

2. The battery pack of claim 1, wherein one end of each of the electrode tabs is electrically coupled to a respective one of the battery cells and another end of each of the electrode tabs is electrically coupled to respective ones of the connection pads.

3. The battery pack of claim 1, wherein the electrode tabs and the connection pads are coupled to each other by solder.

4. The battery pack of claim 3, wherein the cut-out grooves are at regions corresponding to the solder.

5. The battery pack of claim 1, wherein the FPCB surrounds a portion of the battery cells.

6. The battery pack of claim 1, wherein the FPCB further comprises a plurality of wiring patterns.

7. The battery pack of claim 6, wherein the FPCB further comprises an insulation layer surrounding and electrically insulating the wiring patterns.

8. The battery pack of claim 7, wherein the connection pads are exposed by the insulation layer.

9. The battery pack of claim 6, wherein one end of each of the wiring patterns is electrically coupled to respective ones of the connection pads and another end of each of the wiring patterns is electrically coupled to the PCM.

10. The battery pack of claim 1, wherein the FPCB has a plurality of openings allowing the electrode tabs to pass therethrough at locations corresponding to the electrode tabs.

11. The battery pack of claim 1, wherein a side portion of the second case is coupled between the side portion of the first case and each of the ribs.

12. The battery pack of claim 11, wherein the side portion of the first case, the ribs, and the side portion of the second case are coupled at regions outside of regions corresponding to the connection pads.

13. The battery pack of claim 1, wherein the second case comprises a cover part facing the bottom portion, and
wherein the cover part has a recessed groove at a region of an inner surface of the cover part corresponding to the FPCB.

14. The battery pack of claim 13, wherein the region of the cover part corresponding to the FPCB has a thickness less than a thickness of a region outside the region corresponding to the FPCB.

15. The battery pack of claim 1, wherein the electrode tabs are soldered to the FPCB, and
wherein the solder protrudes into ones of the cut-out grooves.

* * * * *